United States Patent Office 3,157,922
Patented Nov. 24, 1964

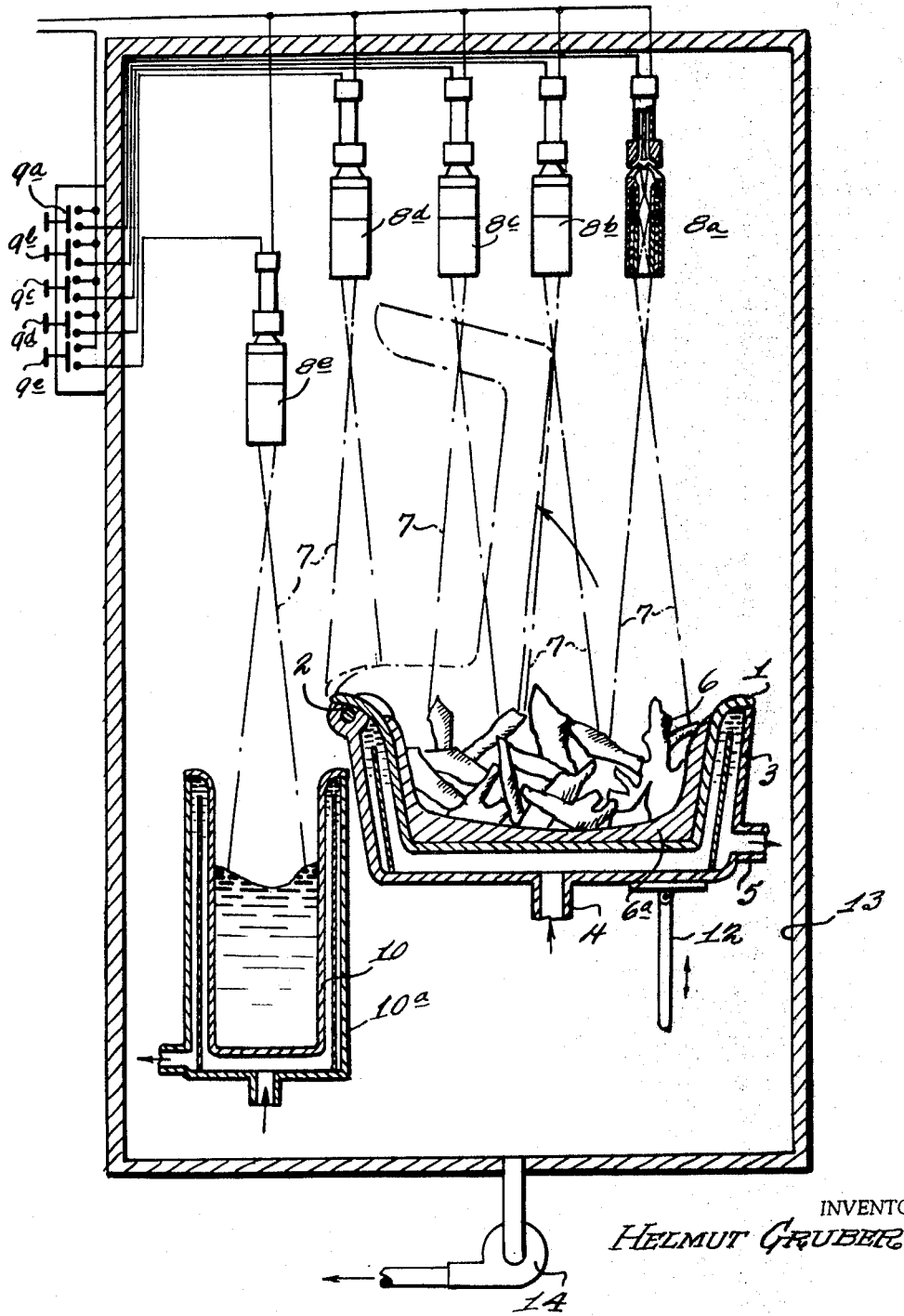

3,157,922
METHOD AND APPARATUS FOR PRODUCING CASTINGS OF METALS HAVING HIGH MELTING POINTS
Helmut Gruber, Hanau am Main, Germany, assignor to W. C. Heraeus G.m.b.H., Hanau am Main, Germany, a corporation of Germany
Filed June 7, 1961, Ser. No. 128,282
Claims priority, application Germany June 25, 1960
4 Claims. (Cl. 22—73)

The present invention relates to a method and an apparatus for producing castings of metals, and particularly of metals with very high melting points, for example, of niobium, molybdenum, tantalum, and tungsten which have a melting point of about 2500° C. and more, as well as of titanium, zirconium, and steel.

It is already known in the art to melt metals with very high melting points in an arc furnace or by means of an electron bombardment under a vacuum. When applying either of these melting methods, it is only possible to produce ingots in which the metal has a relatively large granular size. These ingots must then be further machined to attain the desired parts. For this reason, there has for a long time been a great need for a method which permits the production of castings of metals which have very high melting points.

The known types of vacuum induction melting and casting furnaces are not suitable for casting metals with very high melting points since for this purpose they would necessarily require the use of ceramic melting crucibles which, however, are practically useless for any industrial production because of their low solidity and easy destructibility. Even laboratory experiments within a small range are practically impossible since there are as yet no ceramic materials known for making crucibles which are capable of withstanding the extremely high melting temperatures of the above-mentioned metals. When applying graphite crucibles, an undesirable reaction occurs between the molten metals and the carbon of the crucible. Although it is possible to melt small quantities of metals with very high melting points by inductive heating while freely suspended in space, this method is extremely expensive and unsuitable for producing larger castings.

Casting furnaces of numerous designs are also known which are heated by electric arcs. In a high vacuum furnace it is, however, possible to apply the raw material to be melted by arc heating only in the form of consumable electrodes. This method requires a water-cooled crucible jacket, for example, of copper, in which during the melting process a cruciblelike container is produced of the molten metal. It also requires a relatively high melting speed. Furthermore, this method has the great disadvantages that the bath of molten metal cannot be kept liquid for any desired length of time and that additional materials, for example, scrap metals, can be added and melted only in very small quantities. When applying tiltable crucibles, this known method also requires the energy to be switched off before the casting process. This again has the disadvantage that during the casting process the molten metal cools off far too quickly from the required melting temperatures of about 2500° C. and more because of heat radiation and the conduction of the heat to the water-cooled crucible jacket. The reduction in heat by the water-cooled jacket also has the result that the body of metal which remains molten has a very shallow depth.

The above-mentioned difficulties and disadvantages do not occur if the metals to be melted have a melting point lower than about 1800° C., and for such metals suitable melting and casting apparatus are known for a long time. Thus, for example, metals with such low melting points may be melted by being heated by induction or electric resistance and may thereafter be cast into a mold so as to form an ingot or a molded casting. For melting and casting metals such as steel, iron, or titanium it is also known to heat the raw material indirectly by means of electron beams and to cast it after being melted. These methods and apparatus can, however, not be applied for melting and casting metals which have a melting point of about 2500° C. and more. This new method and apparatus overcome the disadvantages of the previous methods and apparatus as outlined above and permit the advantages of the last-mentioned methods for producing castings from metals with lower melting points also to be attained when melting and casting such high-melting metals. Since the new method permits molded castings of any desired shape rather than mere ingots to be produced, it also has the advantage that the complicated and expensive machining operations which previously had to be carried out to convert the ingot into the shape of the desired article are no longer required.

The present invention consists in melting metals with very high melting points of about 2500° C. and more within a water-cooled melting crucible by bombarding the metals directly with electron beams within a vacuum chamber and in thereafter casting the molten metal from this crucible within the vacuum chamber into one or more molds while continuing to heat the molten metal. By proceeding according to the new method, it is now not only possible to produce molded metal products of any desired shape, but it is also possible to do this without first requiring the raw material to be converted into consumable electrodes. On the contrary, scrap metal pieces of larger or smaller sizes may now be melted directly. A batch of molten metal, if not made of too great a depth, may be kept in the liquid condition for any desired length of time and even during the actual casting operation. The rate of cooling of the molten metal upon which the granular size and thus the quality of the casting depend to a very great extent may be very accurately controlled and held within the desired limits. If large quantities of metals are to be melted, the melting crucible is preferably made of a size so that the molten metal will take up a relatively large surface area. This does not, however, constitute a disadvantage inasmuch as the entire surface of the metal is bombarded with electrons so that the losses in heat which are due to radiation will thereby be compensated. Apart from this it is also possible according to the invention to heat the cast metal still further within the mold. Both processes of melting the metal and casting it may be carried out within a vacuum, which has the additional advantage that the molten or cast metal will at the same time be degassed very extensively.

For casting the molten metal, the following procedure has proved to be very successful. The water-cooled crucible is preferably designed so as to be tiltable to permit the molten metal to be poured therefrom, so that the liquid metal can flow into a mold. The electron source to be applied may consist of electron guns of a conventional type.

The above-mentioned objects, features, and advantages of the present invention will become more clearly apparent from the following description of the accompanying drawings of several apparatus which may be employed for carrying out the combined melting and casting method according to the invention, but which may be considerably modified without departing from the scope of this invention.

In the drawings:

The single figure shows, partly in cross section, a combined melting and casting apparatus according to the invention, in which the crucible is designed to be tilted to pour the molten metal.

Referring to the drawings, the crucible 1 is surrounded and supported by a cooling jacket 3 through which a cooling medium, for example, water, may be circulated which may be supplied through an inlet 4 and be discharged through an outlet 5. Crucible 1 including its cooling jacket 3 is designed so as to permit it to be tilted about an axis 2, for example, of a shaft on a reinforced portion of the upper edge of cooling jacket 3 which supports the pouring lip of crucible 1. The particular means for tilting the crucible are not critical and are illustrated schematically as at 12 in the drawings since they may be of any suitable and conventional construction. The extent to which crucible 1 may be tilted is indicated in FIGURE 1 in dot-and-dash lines. The material 6 to be melted may be filled into crucible 1, for example, in the form of lumpy pieces. For melting this material, it is heated by means of electron beams 7 which are produced, for example, by several electron guns 8a to 8e which may be of a conventional type. These electron guns are mounted at a suitable distance above crucible 1 and are spaced from each other so that only guns 8a and 8c are disposed directly above crucible 1 and their electron beams will strike upon the lumpy material 6 in the crucible to melt the same, leaving the usual skull 6a. These electron sources 8a to 8c may be designed to be tilted or removed out of the range above crucible 1 when the casting process is to be carried out. After the lumpy material 6 has been melted, crucible 1 is tilted about the axis 2 so that the molten metal, while being further heated by an electron bombardment from the electron guns 8d and 8e, will then flow into a mold 10 which is surrounded by a cooling jacket 10a and may be of any desired shape. It is, of course, also possible to fill several molds 10 successively. While the casting process is being carried out and crucible 1 is increasingly tilted toward the position as indicated in dot-and-dash lines, the electron guns 8a to 8c will be switched off one after the other in any desired manner, as by manual switches 9a, 9b, 9c, 9d and 9e, suitably connected to their associated electron guns, as shown in the FIGURE 1, so that the electron beams will impinge upon the molten metal in the crucible as long as possible, but will not impinge upon the crucible itself. The additional heating of the metal in mold 10 by electron gun 8e effectively controls the rate of cooling and thus to a large extent the granular size and quality of the casting. Crucible 1 and mold 10 are preferably disposed in a vacuum chamber 13, of conventional design, which is evacuated in any conventional manner as by an exhaust fan 14, or they may be contained in separate chambers, one of which is adapted to be opened and closed and to be evacuated so that the filled mold may be removed and exchanged without interrupting the vacuum within the melting chamber.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing castings of metals having a melting temperature of at least about 2500° C. comprising the steps of filling a water-cooled crucible in a chamber with at least one metal, evacuating said chamber, bombarding said metal in said crucible directly with a series of electron beams emitted from several electron sources disposed above said crucible so as to melt the metal while maintaining a skull in said crucible, then tilting said crucible so as to pour the molten metal from said crucible over a pouring lip thereof into at least one mold, and while tilting said crucible and pouring the molten metal, successively switching off the electron sources in the direction toward said pouring lip so as to prevent the electron beams from said sources from striking upon the crucible itself, and switching on at least one additional electron source disposed in a position so that the electron beam emitting therefrom will strike upon the molten metal pouring from said crucible into said mold.

2. A method of producing castings of metals having a melting temperature of at least about 2500° C. comprising the steps of filling a water-cooled crucible in a chamber with at least one metal, evacuating said chamber, bombarding said metal in said crucible directly with a series of electron beams emitted from several electron sources disposed above said crucible so as to melt the metal while maintaining a skull in said crucible, then tilting said crucible so as to pour the molten metal from said crucible over a pouring lip thereof into at least one mold, and while tilting said crucible and pouring the molten metal, successively switching off the electron sources in the direction toward said pouring lip so as to prevent the electron beams from said sources from striking upon the crucible itself, and switching on additional electron sources disposed in positions so that the electron beams emitted therefrom will strike upon the molten metal pouring from said crucible and also upon the surface of the molten metal collected in said mold.

3. An apparatus for producing castings of metals having a melting point of at least about 2500° C. comprising a vacuum chamber, a water-cooled melting crucible within said chamber adapted to hold at least one metal, a plurality of electron sources above said crucible and each adapted to direct an electron beam directly upon the metal in said crucible so as to melt the same, at least one mold within said chamber, means for tilting said crucible within said chamber for pouring the molten metal from said crucible into said mold, a plurality of additional electron sources for directing electron beams upon the molten metal pouring over the edge of said crucible when tilted, upon the stream of metal flowing from said edge into said mold, and upon the surface of the metal collected in the mold, and control means for successively switching off at least some of said electron sources directly above said crucible while said crucible is being tilted and for switching on said additional electron sources when said metal begins to pour over the edge of the tilted crucible so as to prevent said electron beams from striking said crucible directly.

4. An apparatus for producing castings of metals having a melting point of at least about 2500° C. comprising a vacuum chamber, a water-cooled melting crucible within said chamber adapted to hold at least one metal, a plurality of electron sources above said crucible and each adapted to direct an electron beam directly upon the metal in said crucible so as to melt the same, at least one mold within said chamber, means for tilting said crucible within said chamber for pouring the molten metal from said crucible into said mold, a plurality of additional electron sources for directing electron beams upon the molten metal pouring over the edge of said crucible when tilted, and upon the stream of metal flowing from said edge into said mold, and control means for successively switching off at least some of said electron sources directly above said crucible while said crucible is being tilted and for switching on said additional electron sources when said metal begins to pour over the edge of the tilted crucible so as to prevent said electron beams from striking said crucible directly.

References Cited in the file of this patent

UNITED STATES PATENTS

| | | |
|---|---|---|
| 2,789,150 | Clough | Apr. 16, 1957 |
| 2,793,282 | Steigerwald | May 21, 1957 |
| 2,871,533 | Swainson | Feb. 3, 1959 |
| 2,958,719 | Beecher | Nov. 1, 1960 |
| 2,963,530 | Hanks | Dec. 6, 1960 |
| 2,965,937 | Pellissier | Dec. 27, 1960 |
| 2,997,760 | Hanks | Aug. 29, 1961 |

OTHER REFERENCES

"Titanium Technology," Metal Industry, August 28, 1959, page 61.